United States Patent [19]

Teach

[11] Patent Number: 4,836,669

[45] Date of Patent: Jun. 6, 1989

[54] APPARATUS AND METHOD FOR PROJECTION OF REFERENCE PLANES OF LIGHT

[75] Inventor: Ted L. Teach, Dayton, Ohio

[73] Assignee: Spectra-Physics, Inc., San Jose, Calif.

[21] Appl. No.: 120,817

[22] Filed: Nov. 16, 1987

[51] Int. Cl.[4] .......................... G02B 5/10; G01B 11/26
[52] U.S. Cl. ........................................ 350/618; 33/290; 356/138; 356/152
[58] Field of Search .................. 33/290, 291, 381; 350/618, 619; 356/152, 172, 248, 138, 150, 151

[56] References Cited

U.S. PATENT DOCUMENTS

| | | | |
|---|---|---|---|
| 3,588,249 | 6/1971 | Studebaker | 33/290 |
| 3,588,255 | 6/1971 | Alexander | 33/290 |
| 3,652,166 | 3/1972 | Bessko et al. | 33/290 |
| 3,820,903 | 6/1974 | Kindl et al. | 356/138 |
| 3,897,637 | 8/1975 | Genho | 33/290 |
| 4,031,629 | 6/1977 | Paluck | 356/172 |
| 4,035,084 | 7/1977 | Ramsay | 356/152 |
| 4,062,634 | 12/1977 | Rando et al. | 356/248 |
| 4,136,962 | 1/1979 | Broower et al. | 356/248 |
| 4,333,242 | 6/1982 | Genho, Sr. | 33/290 |
| 4,441,818 | 4/1984 | Wickman | 33/290 |
| 4,490,919 | 1/1985 | Feist et al. | 33/290 |
| 4,674,870 | 6/1987 | Cain et al. | 356/152 |
| 4,676,598 | 6/1987 | Markley et al. | 350/171 |
| 4,679,937 | 7/1987 | Cain et al. | 356/138 |
| 4,732,471 | 3/1988 | Cain et al. | 356/152 |

Primary Examiner—John K. Corbin
Assistant Examiner—Martin Lerner
Attorney, Agent, or Firm—Killworth, Gottman, Hagan & Schaeff

[57] ABSTRACT

An apparatus and method project light in two orthogonal planes to provide reference planes of light for use in laying out a construction site or the like. The apparatus comprises a laser light source for providing a source beam of light, and a light diverting arrangement. The light diverting arrangement diverts a first portion of the source beam of light to project a first thin reference fan beam of light substantially in a first reference plane, and diverts a second portion of the source beam of light to project a second thin reference fan beam of light substantially in a second reference plane. The second reference plane is substantially perpendicular to the first reference plane. The apparatus may advantageously be used in laying out a grid.

14 Claims, 3 Drawing Sheets

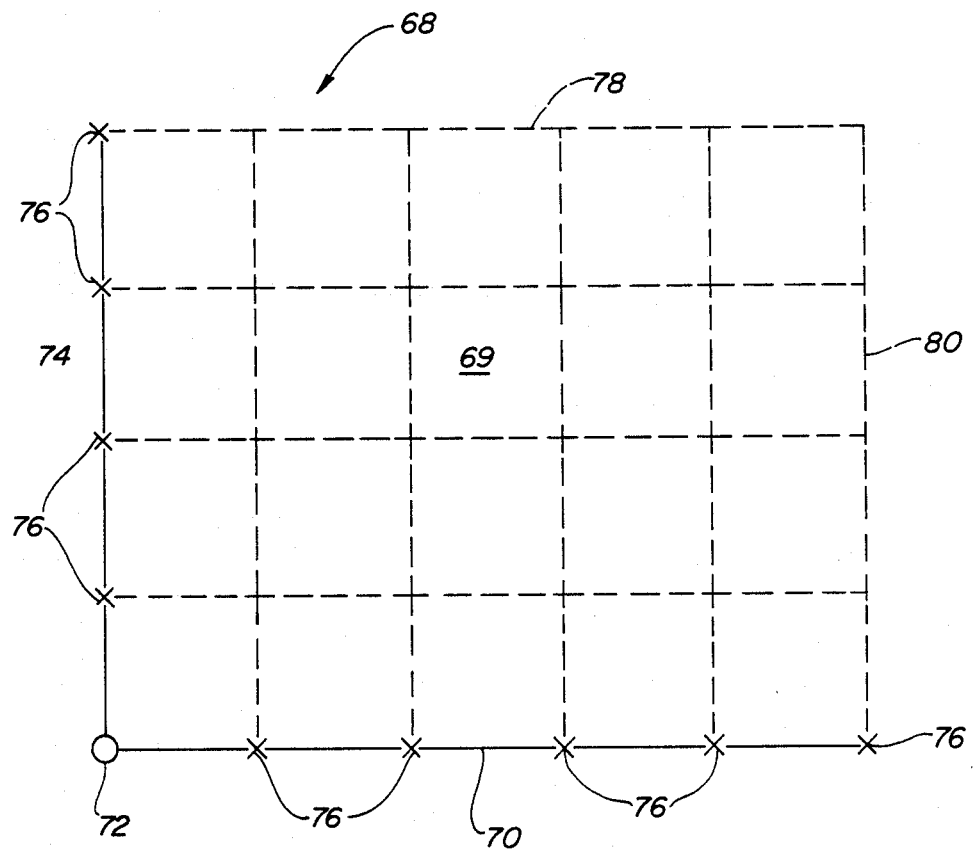

APPARATUS AND METHOD FOR PROJECTION OF REFERENCE PLANES OF LIGHT

BACKGROUND OF THE INVENTION

The present invention relates to an apparatus and method for projecting light in two orthogonal planes and, more particulary, to such an apparatus and method in which reference planes of light are provided for use in laying out a construction site, or the like.

Laser beam systems have been employed in numerous surveying and construction applications. In one such system a laser beam projector provides a rotating laser beam which establishes a reference plane. In use, the projector may, for example, be mounted at the desired height of a hanging ceiling in a building under construction. The beam is rotated in a horizontal plane to assist the workers in determining the proper height for the ceiling throughout the room. The rotating laser beam provides a continuous, visible plane of light that creates a constant horizontal bench mark of elevation over the entire work area.

Typically, the laser projector of this type can also be positioned to provide a vertical reference plane of light, or a plane of light in other orientations. A laser projector can be used in this manner for laying out overhead drop walls and bulkheads, and in other construction operations. U.S. Pat. No. 4,062,634, issued Dec. 13, 1977, to Rando et al; U.S. Pat. No. 4,035,084, issued July 12, 1977, to Ramsay; and U.S. Pat. No. 4,031,629, issued June 28, 1977, to Paluck, all disclose rotating laser beam devices.

An improved rotating beam projector is disclosed and claimed in U.S. Pat. No. 4,676,598, issued June 30, 1987, to Markley et al. The Markley et al projector produces a stationary reference beam, as well as a moving reference beam. The moving reference beam is normal to the stationary reference beam and rotates about an axis which is aligned with the stationary reference beam. The moving beam thus defines a reference plane, while the stationary beam defines a reference line which is perpendicular to the reference plane. In using such a device, the plane defined by the rotating beam may be aligned with a building structure, for example a wall, and the stationary beam then provides a reference line which is normal to the wall.

While the Markley et al projector provides substantial improvements over earlier laser beam projection systems in that a line and a plane can be defined simultaneously by the projected laser beams, nevertheless a need exists for a laser beam projection system more suited for facilitating the layout of a reference grid. More specifically, a need exists for a beam projection device which is capable of simultaneously projecting a pair of substantially orthogonal beams of laser light which each diverge into thin, fan beams of light in generally vertical planes.

Such fan beams effectively provide a pair of perpendicular planes of light which may be easily sensed by an appropriate sensor positioned in the planes at any height. Additionally, such a beam projection device may be positioned at a corner of the desired reference grid and aligned to project one plane of light along a desired base line. When the device is aligned in this manner, the second, orthogonal plane of light defines a side line of the grid. Sensors may be used to determine the location of the second plane of light and, therefore, the side line. Cross points of the reference grid may be determined by measuring distances along the base and side lines, and the process may be repeated at other corners of the grid.

It is seen that there is a need, therefore, for a laser beam projection apparatus and method in which the lay out of a reference grid is facilitated and in which light is projected in two orthogonal planes to provide reference planes of light.

SUMMARY OF THE INVENTION

These needs are met by an apparatus and method according to the present invention for projecting light in two orthogonal planes to provide reference planes of light for use in laying out a construction site or the like. The apparatus comprises light means for providing a source beam of light, and passive light diverting means. The light diverting means diverts a first portion of the source beam of light to project a first thin stationary reference fan beam of light substantially in a first reference plane, and diverts a second portion of the source beam of light to project a second thin stationary reference fan beam of light substantially in a second reference plane which is substantially perpendicular to the first reference plane. The light means may comprise a source of collimated laser light, such as collimated infrared laser light.

The passive light diverting means may comprise a substantially conical reflector having a curved reflective surface. The conical reflector is positioned in the path of the source beam of light with the axis of the conical reflector aligned therewith so as to reflect the source beam of light generally radially outward from the conical reflector. The light diverting means may further comprise first and second mirrors positioned radially outward from the conical reflector on opposite sides thereof for intercepting and reflecting a portion of the light from the conical reflector. The first mirror reflects light from the conical reflector to project the first thin stationary reference fan beam of light substantially in the first plane and the second mirror reflects light from the conical reflector to project the second thin stationary reference fan beam of light in the second plane.

The substantially conical reflector defines an included angle at its apex of substantially ninety degrees such that the source beam of light is reflected radially outward, substantially in a plane. The first and second mirrors are then each positioned with their respective reflective surfaces oriented at an angle of approximately 67.5 degrees with respect to the axis of the substantially conical reflector.

Apparatus for use in laying out a construction site or the like may comprise a source of laser light, and passive means for directing a first portion of the laser light substantially in a first reference plane as a first thin stationary reference fan beam of light, and for directing a second portion of the laser light substantially in a second reference plane as a second thin stationary reference fan beam of light, with the second reference plane being substantially perpendicular to the first reference plane. The source of laser light may provide a beam of collimated infrared laser light.

The passive means for directing may comprise a reflector means having a curved reflective surface, the reflector means being positioned in the path of the source beam of light to reflect the source beam of light generally outward from the conical reflector. The means for directing may further comprise first and second mirrors positioned on opposite sides of the reflector means for intercepting and reflecting a portion of the light from the reflector means. The first mirror reflects light from the reflector means to project the first thin stationary reference fan beam of light substantially in the first plane and the second mirror reflects light from the reflector means to project the second thin stationary reference fan beam of light in the second plane.

The reflector means may comprise a substantially conical reflector defining an included angle at its apex of substantially ninety degrees such that the source beam of light is reflected radially outward, substantially in a plane. The first and second mirrors are each positioned with their respective reflective surfaces oriented at an angle of approximately 67.5 degrees with respect to the axis of the substantially conical reflector.

The apparatus may further comprise means for mounting the light means and the light diverting means for rotation thereof about an axis which coincides with the intersection of the first and second reference planes.

A method according to the present invention of laying out a grid on a surface, comprises the steps of:

a. establishing a base line and a first corner on the surface for the grid;

b. directing laser light substantially in a first reference plane as a first thin reference fan beam of light, the first reference plane being normal to the surface and including the base line;

c. simultaneously directing laser light substantially in a second reference plane as a second thin reference fan beam of light, the second reference plane being substantially normal to the first reference plane and to the surface so as to define a side line of the grid extending at a right angle to the base line, and d. detecting the first and second thin reference fan beams of light at measured distances from the first corner so as to define cross points for the grid.

The step of directing laser light substantially in a first reference plane as a first thin reference fan beam of light, and the step of simultaneously directing laser light substantially in a second reference plane as a second thin reference fan beam of light may both include directing amplitude modulation infrared laser light.

The method may also comprise the further step of moving to the measured end of either the base line or the side line and repeating steps a. through d. until all four corners of the grid have been established and cross points measured along the base line and along all three sidelines.

Accordingly, it is an object of the present invention to provide an apparatus and method for facilitating the layout of a construction site or the like in which a pair of orthogonal reference planes are defined by a pair of thin reference fan beams of light; to provide such an apparatus and method in which said pair of orthogonal reference beams of light are produced from a single source beam of light; to provide such an apparatus and method in which said beams of light are laser light; and to provide an apparatus and method in which a grid may be easily and quickly defined on a surface.

Other objects and advantages of the invention will be apparent from the following description, the accompanying drawings and the appended claims.

BRIEF DESCRIPTION OF THE DRAWINGS

FIG. 4 is a plan, schematic drawing of a reference grid, useful in explaining the manner in which such a grid is laid out by means of the present invention.

DETAILED DESCRIPTION OF THE PREFERRED EMODIMENTS

Figure 1:
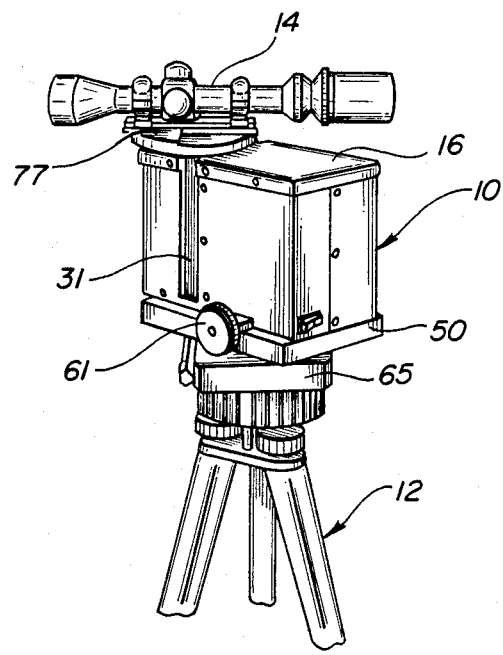
FIG. 1 is a perspective view of the laser beam projection apparatus of the present invention.
Figure 2:
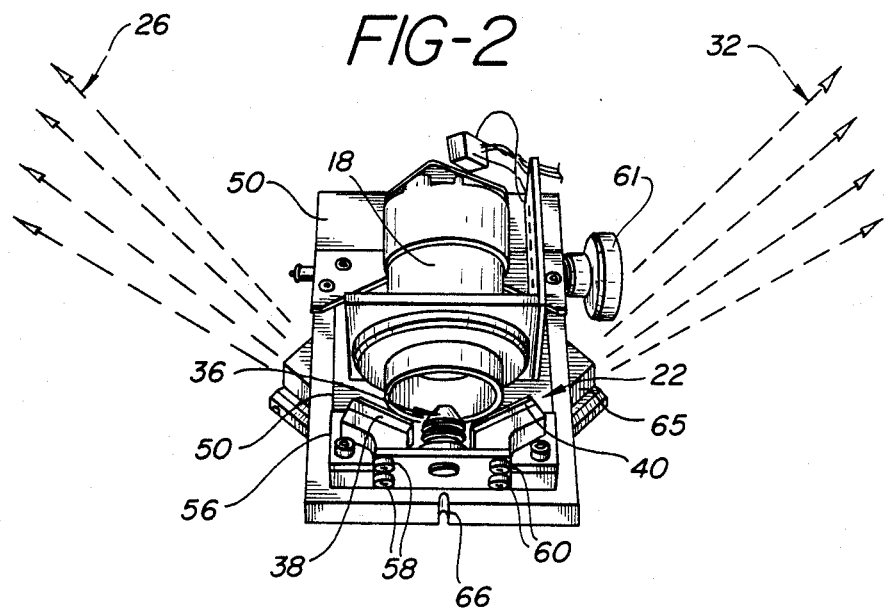
FIG. 2 is a view of the apparatus of FIG. 1, with the cover removed, illustrating the manner in which the orthogonal beams of laser light are projected.
Figure 3:
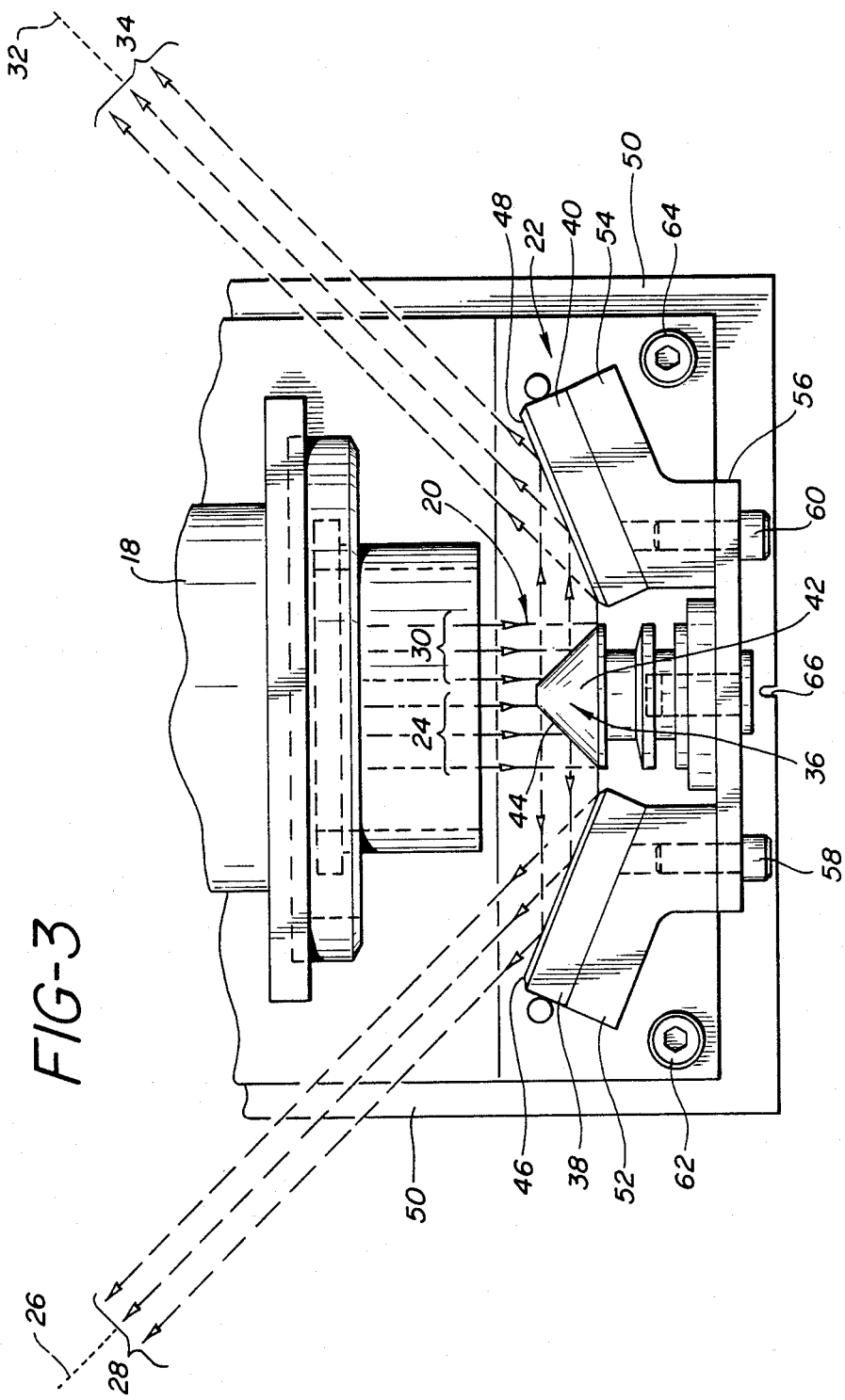
FIG. 3 is a partial, enlarged plan view of the apparatus, illustrating diversion of the source beam into the orthogonal beams of laser light.

Reference is made to FIGS. 1-3 which illustrate a preferred embodiment of laser beam projection apparatus 10 constructed according to the present invention. The apparatus 10 is preferably mounted on a tripod support 12 to facilitate movement and set up of the apparatus. A telescopic sight 14 may be mounted on top of the housing 16 for use in setting up the apparatus, as described below.

The apparatus includes a source 18 of laser light. Source 18 preferably includes an infrared laser diode and a collimating lens assembly which collimates the light and projects the light as a source beam 20. The apparatus 10 further includes a light diverting means 22 for diverting or directing a first portion 24 of the laser source beam 20 substantially in a first reference plane, indicated at 26, as a first thin reference fan beam of light 28. The light diverting means 22 diverts or directs a second portion 30 of the laser source beam 20 substantially in a second reference plane, indicated at 32, as a second thin reference fan beam of light 34. The housing 16 defines a pair of openings 31 on opposite sides of the apparatus 10, one of which is shown in FIG. 1, to permit the passage of the beams 28 and 34.

As best illustrated in FIG. 3, the second reference plane 32 is substantially perpendicular to said first reference plane 26. The planes 26 and 32 are substantially vertical and therefore appear in FIG. 3 as dashed reference lines. The beams 28 and 34 are relatively thin, such as for example approximately ⅛th of an inch in width. It will be appreciated, however, that the beams do have some thickness and are therefore completely "within" a plane, as such. The beams are each said to be substantially within a plane in the present description in that the width of the beams is sufficiently small to define a reference line within desired dimensional limits.

The means 22 for directing or diverting the source beam 20 includes a reflector means 36, and first and second mirrors 38 and 40, respectively. The reflector means 36 is configured as a substantially conical reflector 42 having a curved reflective surface 44. The reflector means 36 is positioned in the path of the source beam of light 20 to reflect the source beam of light generally outward therefrom.

The first and second mirrors 38 and 40 are positioned on opposite sides of the reflector means 36 to intercept and reflect a portion of the light reflected therefrom. The first mirror 38 reflects light from the reflector means 36 to project the first thin reference fan beam of light 28 substantially in the firsst plane 26. The second mirror 40 reflects light from the reflector means 36 to project the second thin reference fan beam of light 34 in the second plane 32.

The substantially conical reflector 42 is illustrated as a truncated cone. As will be appreciated, either a truncated conical shape reflector or a full conical shape reflector may be utilized to reflect a portion of light in source beam 20 radially outward. With the truncated conical shape, the light striking the flat surface at the top of the cone is simply reflected back toward the light source 18 and does not affect operation of the apparatus. In either event, it is preferable that the conical reflector define an included angle at its apex of substantially ninety degrees such that the source beam of light is reflected radially outward, substantially in a plane. If the included angle is greater or less than ninety degrees, the light will be reflected outward on a slight conical shape. After reflection by mirrors 38 and 40, the light beams 28 and 34 in such a case would not define true planes, but rather would define curved surfaces. Depending upon the degree of accuracy required, however, it may be acceptable to utilize reference beams having slight curves from top to bottom, and thus an included angle of other than ninety degrees for the conical reflector may be acceptable.

The first and second mirrors 38 and 40 are each positioned with their respective reflective surfaces 46 and 48 oriented at an angle of approximately 67.5 degrees with respect to the axis of the substantially conical reflector 42. As a result the portions of the plane of light reflected outward from reflector 42 are intercepted by the mirrors 38 and 40 and are reflected outward in planes 26 and 32 which are orthogonal.

A means for mounting the laser light source means 18 and the light diverting means 22 includes a base plate 50. The mirrors are mounted on supports 52 and 54 which are secured to plate 56 by bolts 58 and 60, respectively. Plate 56 is attached to plate 50, in turn, by bolts 62 and 64. Base plate 50 is mounted on the support plate 65 of the tripod 12 such that the entire apparatus may be positioned and leveled in the conventional manner. If desired, level vials may be mounted on top of housing 16 to facilitate manual positioning of the apparatus. Alternatively, any of a number of known automatic leveling systems may be utilized in conjunction with the appratus of the present invention.

The mounting arrangement provides for rotation of the apparatus about a vertical axis upon release of the tripod mechanism by means of adjustment knob 61. Preferably this axis coincides with the intersection of the first and second reference planes 26 and 32. The intersection of these reference planes may be placed at a corner of a reference grid which is to be laid out, and the apparatus then rotated to align one or the other of the reference planes with a desired base line of the grid. The other of the reference planes is then directed along a side line of the grid. To facilitate this process, a notch 66 may be provided in the end of the base plate 50, indicating the precise position of the intersection of the reference planes 26 and 32. A plum line in the notch 66 may be used to determine the precise point of the corner on the surface supporting the tripod 12.

FIG. 4 illustrates a method of laying out a grid 68 on a surface 69, such as for example a floor at a construction site, according to the present invention. Initially, a base line 70 and a first corner 72 are established for the grid 68. The apparatus of the present invention is then positioned at the corner 72 and the thin reference fan beam of light 34 is oriented such that the reference plane 32 is normal to the surface 69 and includes the base line 70. Simultaneously the thin reference fan beam of light 28 is projected, with the reference plane 26 being substantially normal to the reference plane 32 and to the surface 69 so as to define a side line 74 of the grid 68 extending at a right angle to the base line 70.

Finally, the thin reference fan beams of light 28 and 32 are detected at measured distances from the first corner 72 so as define cross points 76 for the grid 68. As stated previously. The laser beams are in the infrared region, and detectors capable of detecting light in this wavelength range are therefore necessary for this operation. One type of detector which may be utilized for this step is described in U.S. Pat. No. 4,674,870, issued June 23, 1987, to Cain et al. With the Cain et al detector arrangement, the laser beam is amplitude modulated at a frequency of approximately 8 KHz. The detector includes filter circuitry for this frequency which provides for the elimination of a great deal of the noise signals produced by ambient light. The telescopic sight 14 may be pivoted on rotatable support 77 mounted on housing 16 so that it is in either of two reference positions in which it sights along plane 26 and 32. An operator using telescopic sight 14 may direct a second worker carrying the detector such that the detector is placed approximately in line with the appropriate reference plane.

The lay out process may then be repeated by moving the apparatus to the measured end of either the base line 70 or the side line 74 and repeating the steps described above until all four corners of the grid 68 have been established and cross points measured along the base line 70 and along all three sidelines 74, 78, and 80.

Having described the invention in detail and by reference to preferred embodiments thereof, it will be apparent that modifications and variations are possible without departing from the scope of the invention defined in the appended claims.

What is claimed is:

1. Apparatus for projecting light in two orthogonal planes to provide reference planes of light for use in laying out a construction site or the like, comprising:
    light means for providing a source beam of light, and
    passive light diverting means for diverting a first portion of said source beam of light to project a first thin stationary reference fan beam of light substantially in a first reference plane, and for diverting a second portion of said source beam of light to project a second thin stationary reference fan beam of light substantially in a second reference plane which is substantially perpendicular to said first reference plane.

2. The apparatus of claim 1 for projecting light in two orthogonal planes to provide reference planes of light for use in laying out a construction site or the like, in which said light means comprises a source of collimated laser light.

3. The apparatus of claim 2 for projecting light in two orthogonal planes to provide reference planes of light for use in laying out a construction site or the like, in which said source of collimated laser light comprises a source of collimated infrared laser light.

4. The apparatus of claim 1 for projecting light in two orthogonal planes to provide reference planes of light for use in larying out a construction site or the like, in which said passive light diverting means comprises:
    a substantially conical reflector having a curved reflective surface, said conical reflector positioned in the path of said source beam of light with the axis of said conical reflector aligned therewith so as to reflect said source beam of light generally radially outward from said conical reflector, and
    first and second mirrors positioned radially outward from said conical reflector on opposite sides thereof for intercepting and reflecting a portion of the light from said conical reflector, said first mirror reflecting light from said conical reflector to project said first thin stationary reference fan beam of light substantially in said first plane and said second mirror reflecting light from said conical reflector to project said second thin stationary reference fan beam of light in said second plane.

5. The apparatus of claim 4 for projecting light in two orthogonal planes to provide reference planes of light for use in laying out a construction site or the like, in which said substantially conical reflector defines an included angle at its apex of substantially ninety degrees such that said source beam of light is reflected radially outward, substantially in a plane.

6. The apparatus of claim 5 for projecting light in two orthogonal planes to provide reference planes of light for use in laying out a construction site or the like, in which said first and second mirrors are each positioned with their respective reflective surfaces oriented at an angle of approximately 67.5 degrees with respect to the axis of said substantially conical reflector.

7. Apparatus for use in laying out a construction site or the like, comprising:
  a source of laser light, and
  passive means for directing a first portion of said laser light substantially in a first reference plane as a first thin stationary reference fan beam of light, and for directing a second portion of said laser light substantially in a second reference plane as a second thin stationary reference fan beam of light, said second reference plane being substantially perpendicular to said first reference plane.

8. The apparatus of claim 7 in which said source of laser light comprises a source of collimated infrared laser light.

9. The apparatus of claim 7 in which said source of laser light provides a source beam of light.

10. The apparatus of claim 9 in which said passive means for directing comprises:
  reflector means having a curved reflective surface, said reflector means positioned in the path of said source beam of light to reflect said source beam of light generally outward from said reflector means, and
  first and second mirrors positioned on opposite sides of said reflector means for intercepting and reflecting a portion of the light from said reflector means, said first mirror reflecting light from said reflector means to project said first thin stationary reference fan beam of light substantially in said first plane and said second mirror reflecting light from said reflector means to project said second thin stationary reference fan beam of light in said second plane.

11. The apparatus of claim 9 in which said reflector means comprises a substantially conical reflector defining an included angle at its apex of substantially ninety degrees such that said source beam of light is reflected radially outward, substantially in a plane.

12. The apparatus of claim 11 in which said first and second mirrors are each positioned with their respective reflective surfaces oriented at an angle of approximately 67.5 degrees with respect to the axis of said substantially conical reflector.

13. The apparatus of claim 7, further comprising means for mounting said light means and said light diverting means.

14. The apparatus of claim 13 in which said means for mounting said light means and said means for directing provides for rotation thereof about an axis which coincides with the intersection of said first and second reference planes.

* * * * *

UNITED STATES PATENT AND TRADEMARK OFFICE
CERTIFICATE OF CORRECTION

PATENT NO. : 4,836,669

DATED : June 6, 1989

INVENTOR(S) : Ted L. Teach

It is certified that error appears in the above-identified patent and that said Letters Patent is hereby corrected as shown below:

```
Col. 4, line 61 "firsst" should be --first--.
Col. 5, line 39 "appratus" should be --apparatus--.
Col. 6, line 59 "larying" should be --laying--.
```

Signed and Sealed this

Third Day of July, 1990

Attest:

HARRY F. MANBECK, JR.

Attesting Officer

Commissioner of Patents and Trademarks